United States Patent Office 2,776,222
Patented Jan. 1, 1957

2,776,222
METHOD FOR TREATING CALCIUM SULFATE PIGMENTS

Warren M. Foss, Nixon, and Franklin L. Kingsbury, New Brunswick, N. J., assignors to National Lead Company, New York, N. Y., a corporation of New Jersey No Drawing. Application October 3, 1952,
Serial No. 313,052

7 Claims. (Cl. 106—306)

The present invention relates in general to pigment materials and more especially to improved calcium sulfate pigments and to a method for controlling the blanching properties thereof.

The term "calcium sulfate pigments" as used herein shall be understood to mean and include not only pigmentary calcium sulfate but also composite pigments containing calcium sulfate such as, for example, composite titanium dioxide-calcium sulfate pigments.

The blanching properties of a calcium sulfate pigment may be defined as those characteristics of a pigment which when used to formulate paints of high pigment-volume concentration will form a paint which, when dry, will be lighter in color than when wet. This property of calcium sulfate pigments is not evident in gloss paints but is peculiar to paints having a high pigment volume concentration by which is meant that the ratio of dry pigment to the liquid vehicle used in a paint formulation is relatively high. Specifically, a paint formulation having a pigment volume concentration (PVC) range of from 55% to 70% will be referred to, for the purposes of describing the present invention, as a paint having high pigment volume concentration within which range are included flat and semi-gloss paints.

While this blanching property of pigmentary calcium sulfate is not detrimental to good hiding power, weathering and other desirable characteristics of a high quality paint, it is particularly disadvantageous when attempting to match the color of a fresh wet paint with the color of a dry painted surface; or to utilize a calcium sulfate pigment interchangeably with other pigmentary material in a flat or semi-gloss paint of a given formula.

An object, therefore, of the present invention is to provide a treated calcium sulfate pigment having non-blanching properties for use in paint formulations of high pigment volume concentration.

Another object of the invention is to provide a treated calcium sulfate pigment which may be used interchangeably with other pigment materials in flat and semi-gloss paint formulae.

A further object of the invention is to provide an improved treatment for pigmentary calcium sulfate and composite titanium dioxide-calcium sulfate pigments such that high pigment volume concentration paints prepared from such treated pigments will have substantially the same brightness both in their wet and dry states.

These and other objects of the invention will become apparent from the following description.

In its broadest aspects, the present invention contemplates treatment of calcium sulfate pigment material for lowering the blanching properties thereof, which treatment comprises admixing with calcium sulfate pigment material an organic compound comprising straight chain primary amines having from 8 to 18 or more carbon atoms.

The invention has its conception in the discovery that the addition of a straight chain primary amine to a calcium sulfate pigment effectively eliminates the objectionable blanching properties of the pigment, as used in paints of high pigment volume concentration, without adversely affecting the ageing, consistency, hiding power and other desirable properties of the paint. The nature of the reaction between the organic compound and the pigment material is difficult to analyze quantitatively, but it is postulated that the organic compound adheres to the pigment particles and serves somewhat in the nature of a wetting agent to lower the oil demand of the pigment.

The most efficacious organic compounds are those of the straight chain saturated and unsaturated primary amines having from 8 to 18 carbon atoms, and included among these amines are:

SATURATED PRIMARY AMINES

Octyl amine, $CH_3(CH_2)_7NH_2$
Decyl amine, $CH_3(CH_2)_9NH_2$
Dodecyl amine, $CH_3(CH_2)_{11}NH_2$
Tetradecyl amine, $CH_3(CH_2)_{13}NH_2$
Hexadecyl amine, $CH_3(CH_2)_{15}NH_2$
Octadecyl amine, $CH_3(CH_2)_{17}NH_2$ and compositions of 8 to 18 or more carbon chain length formed by admixtures of the above saturated primary amines:

UNSATURATED PRIMARY AMINES

Hexadecenyl amine, $CH_3(CH_2)_5CH=CH(CH_2)_8NH_2$
Octadecenyl amine, $CH_3(CH_2)_7CH=CH(CH_2)_8NH_2$
Octadecadienyl amine, $CH_3(CH_2)_4CH=CHCH_2CH=CH(CH_2)_8NH_2$
Octadecatrienyl amine, $CH_3CH_2CH=CHCH_2CH=CHCH_2CH=CH(CH_2)_8NH_2$ and compositions of 8 to 18 or more carbon chain length formed by admixtures of the above unsaturated primary amines; and compositions of 8 to 18 or more carbon chain length formed by admixtures of the above identified saturated and unsaturated primary amines such as, for example:

(1) An aliphatic amine comprising substantially 90 parts octylamine, 3 parts hexylamine and 7 parts decylamine, and known to the trade as Armeen 8D;

(2) An aliphatic amine comprising substantially 47 parts octadecadienylamine, 35 parts octadecenylamine and 10 parts hexadecylamine and octadecylamine respectively, and known to the trade as Armeen SD; and (3) An aliphatic amine comprising substantially 45 parts hexadecylamine, and known to the trade as Armeen TD.

The amounts of amino compounds to be admixed with the calcium sulfate pigment has been found to be critical for paint formulae of high pigment volume concentration. Amounts between about 0.1% and 0.5% based on the amount of pigment cover the critical range for flat and semi-gloss paints, the preferred amount being about 0.3%. Amounts less than 0.1% have substantially no appreciable effect on reducing the blanching properties of the calcium sulfate pigment while amounts in excess of 0.5% cause poor drying, have a negative blanching effect, that is to say, tend to cause the paint film to darken upon drying, and have been found to adversely effect "can stability" i. e. retention of its original characteristics during storage.

The organic amine compounds may be admixed with the pigment material in any convenient manner. If the amine is a solid, it may be incorporated into the dry finished pigment by milling the solid amine and the dry pigment. However, it is preferable to add the amine in the form of a liquid and to this end the solid amines may be dissolved in a suitable volatile solvent such as, for example, denatured ethyl alcohol, the solution being added drop by drop to the dry pigment. If necessary, the solvent may be removed by evaporation from the mixed pigment. If the amine is to be added into a pigment which, in the course of manufacture, is to be subjected to a milling treatment, either wet or dry milling or both, the addition of the amine may be made prior to, during or after such milling treatment. If the pigment required a calcination treatment, the amine should always be added after such treatment. In short, the method of incorporating the amine into the pigment material is not in itself of particular moment provided an intimate association of the amino compound and pigment particles is achieved.

To compare the blanching properties of calcium sulfate pigments treated by the process of this invention, a standard test was adopted wherein a gray flat paint is prepared by mixing together the following ingredients in the proportions indicated:

| | |
|---|---|
| Treated calcium sulfate pigment _____ grams __ | 450 |
| Whiting (Swansdown) _____ do ____ | 112½ |
| Blend vehicle (oleo resin varnish blend, 40% non-volatile) _____ grams __ | 136.7 |
| Mineral spirits _____ cubic centimeters __ | 53.5 |
| Dryer 24% Pb (Nuodex) _____ do ____ | 4.3 |

The ingredients are mixed for ten minutes in a pony mixer and then ground in a loose contact three roller mill. To the ground mixture is added 71.5 cubic centimeters mineral spirits, 1.2 cubic centimeters dryer (6% Co Nuodex), and 5.4 grams Dutch Boy color-in-oil black, and the mixture again thoroughly mixed until homogenous. A uniform film of the mixed paint is then drawn down with an 0.003" Bradley blade on a lacquer coated panel and the brightness of the wet film is measured with a standardized Hunter reflectometer using a gray plate on a green filter. When dry, the brightness of the film is again measured and the difference in brightness, upon drying, is taken as a measure of "blanching."

Prior to the discovery which characterized the present invention, calcium sulfate pigments when tested in a flat or semi-gloss paint formulated in the manner described above would have wet reffectance values of from 28.8 to 30.0 and dry reffectance values of from 32.5 to 33.4, the differences in reflectance values (blanching) ranging from 3.5 to 4.6, the percent change in blanching ranging from 11.7% to 16.0%.

However, with the discovery of the improved treatment of calcium sulfate pigment by the addition of from 0.1 to 0.5% straight chain primary amines having from 8 to 18 or more carbons, paints having a high pigment volume concentration and formed from a treated calcium sulfate pigment have had highly superior blanching properties, the differences between the wet reflectance and the dry reflectance values ranging from 0.1 to 2.5 and the percent change in blanching ranging from 0.4% to 6.0%. Moreover, the treated pigment retained its improved blanching properties during storage.

To further illustrate the invention, the following specific examples are given:

*Example I*

500 parts of calcium sulfate pigment was put into an edge-runner mill and milled for approximately ten minutes. During this time 1.5 parts of octyl amine diluted in denatured alcohol in the ratio of 60 grams amine per liter of diluent were added drop by drop to the pigment being milled, the amount of treating agent added being calculated to be about 0.3% based on the weight of the pigment.

The treated pigment was then tested for blanching properties by the test hereinabove described and was found to have a difference in wet and dry brightness of +0.9 or a change in blanching of about 3.0%.

*Example II*

Substantially the same procedure was used in Example II as in Example I except that during the milling of the calcium sulfate pigment, 1.75 parts of octadecenyl amine diluted in denatured alcohol in the ratio of 60 grams amine per liter of diluent were added to the pigment, the amount of treating agent added being calculated to be about 0.35% based on the weight of the pigment.

The treated pigment was tested for blanching properties in the manner hereinabove described and was found to have a difference in wet and dry brightness of +1.1 or a change in blanching of about 3.5%.

*Example III*

The procedures used in Examples I and II were used in carrying out Example III except that in this instance 1.75 parts of octadecadienyl amine diluted in denatured alcohol in the ratio of 60 grams amine per liter of diluent were added drop by drop to the pigment while it was being milled, the amount of treating agent added being calculated to be about 0.35% based on the weight of the pigment.

The treated pigment was then tested for blanching properties in the manner hereinabove described and was found to have a difference in wet and dry brightness of +1.4 or a change in blanching of about 4.4%.

From the foregoing description and examples, it will be evident that the improved treatment of calcium sulfate pigments by the addition thereto of a straight chain primary amine having from 8 to 18 or more carbons greatly reduced the blanching properties of the pigment material, as a consequence of which the treated pigment will have substantially the same tint when dry as when wet, thereby readily facilitating matching the colors of paints formulated from calcium sulfate pigment material. Moreover, the treated calcium sulfate pigment may be used interchangeably with other pigment materials in flat and semi-gloss paints without requiring any change in the paint formulae.

While this invention has been described and illustrated by the examples shown, it is not intended to be strictly limited thereto, and other modifications and variations may be employed within the scope of the following claims.

We claim:

1. Method for treating a calcium sulfate pigment to lower the blanching properties thereof for use in a film-forming composition having a pigment volume concentration within the range of from 55%–70% which comprises admixing with a calcium sulfate pigment from 0.1% to 0.5%, based on the amount of pigment of a straight chain mono primary amine containing at least 8 carbon atoms.

2. Method according to claim 1 wherein the straight chain mono primary amine is an unsaturated amine.

3. Method according to claim 1 wherein the straight chain mono primary amine is a saturated amine.

4. Method according to claim 1 wherein the straight chain mono primary amine is a composition comprising a mixture of saturated and unsaturated amines.

5. Method according to claim 1 wherein the straight chain primary amine is an octylamine having the formula $CH_3(CH_2)_7NH_2$.

6. Method according to claim 1 wherein the straight chain primary amine is an octadecadienylamine having the formula:

$$CH_3(CH_2)_4CH=CHCH_2CH=CH(CH_2)_8NH_2$$

7. Method according to claim 1 wherein the straight chain primary amine is an aliphatic amine having the composition:

45 parts octadecenylamine
25 parts octadecylamine
30 parts hexadecylamine

References Cited in the file of this patent

UNITED STATES PATENTS

| | | |
|---|---|---|
| 2,341,994 | Kingsbury et al. | Feb. 15, 1944 |
| 2,365,560 | Kingsbury et al. | Dec. 19, 1944 |
| 2,531,396 | Carter et al. | Nov. 28, 1950 |
| 2,531,825 | Peterson et al. | Nov. 28, 1950 |
| 2,578,605 | Sears et al. | Dec. 11, 1951 |